No. 636,195. Patented Oct. 31, 1899.
A. BURCKARD.
COFFEE POT.
(Application filed May 11, 1899.)
(No Model.)
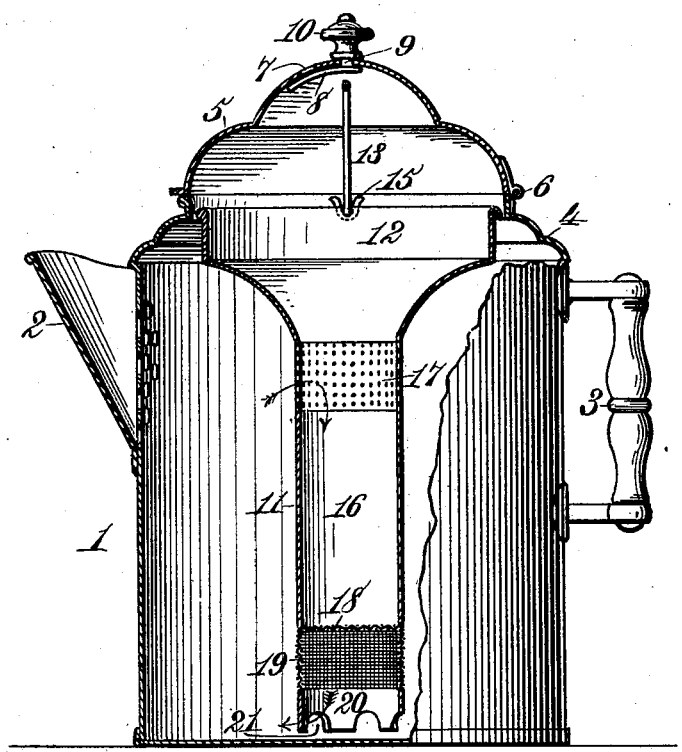
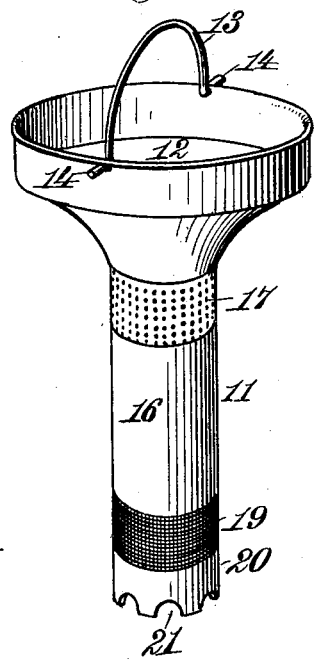
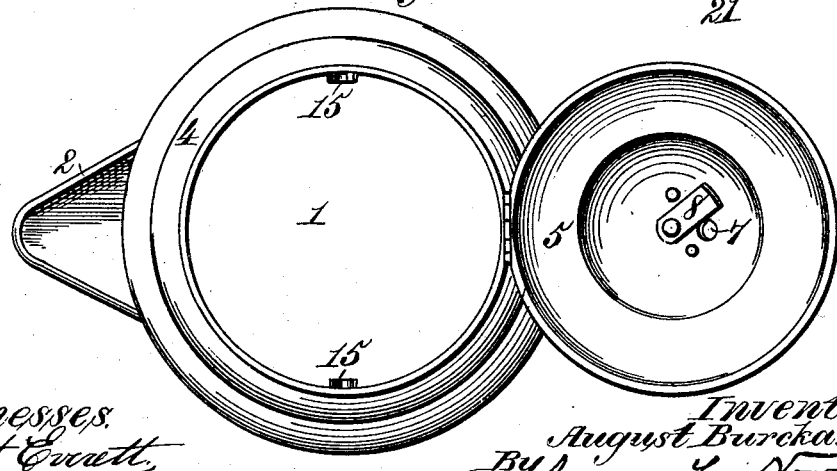
Witnesses
Robert Everett
J. Granville Meyer
Inventor
August Burckard,
By James L. Norris
Atty

UNITED STATES PATENT OFFICE.

AUGUST BURCKARD, OF BALTIMORE, MARYLAND, ASSIGNOR OF ONE-HALF TO FREDERICK T. DORTON, OF SAME PLACE.

COFFEE-POT.

SPECIFICATION forming part of Letters Patent No. 636,195, dated October 31, 1899.

Application filed May 11, 1899. Serial No. 716,387. (No model.)

*To all whom it may concern:*

Be it known that I, AUGUST BURCKARD, a citizen of the United States, residing at Baltimore city, in the State of Maryland, have invented new and useful Improvements in Coffee-Pots, of which the following is a specification.

My invention relates to that class of coffee-pots in which there is provision for making and clarifying coffee or tea by percolation and steaming; and the improvements consist in features of construction and novel combination of parts in a percolator for coffee-pots, teapots, and similar utensils, as hereinafter described and claimed.

In the annexed drawings, illustrating the invention, Figure 1 is a sectional elevation of a coffee-pot embodying my improvements. Fig. 2 is a top plan view of the same with the lid thrown back. Fig. 3 is a perspective of the percolator detached.

Referring to the drawings, the numeral 1 designates a pot or vessel having a nose or spout 2 on one side and a preferably wooden handle 3 attached to its other side. The vessel 1, as shown, is provided at the top with a contracted rim 4, to which a dome-shaped cover or lid 5 is connected by means of a hinge 6, as shown. In the cover 5 there is preferably a vent-opening 7, controlled by a valve 8 on the lower end of a stem 9, that is extended vertically through the center of said cover. The upper end of this valve-stem 9 is headed to hold in place a knob 10, by which said stem may be turned for operating the valve 8 to open or close the vent-opening.

In the pot or vessel 1 there is pivotally suspended a funnel-shaped and partly-foraminous percolator 11, which is capable of swinging with movements of the pot or vessel 1, so as to always maintain a perpendicular position therein. This percolator is constructed with a funnel-shaped top portion 12, the rim of which has a diameter a little less than the diameter of the rim of the coffee-pot or vessel 1, in which said percolator is to be suspended. A bail or handle 13 is pivotally attached to the rim of the funnel-shaped percolator-top, and the pivots 14 of this bail are extended laterally, as shown, to serve also as pivots for supporting the percolator in the coffee-pot. For this purpose the said pivots 14 are removably engaged in bearings 15, that are provided in the coffee-pot or vessel 1 at or near its rim. Thus by means of these pivots 14 the percolator is readily suspended, so as to be capable of swinging, thereby maintaining a perpendicular position both when the pot 1 is at rest and when it is tilted for pouring off its contents. On throwing back the hinged lid or cover 5 the percolator can be readily lifted out by means of its bail or handle 13.

The main portion of the percolator comprises a coffee-cylinder 16, which is provided at the top with a perforated or foraminous section 17, that connects with the funnel-shaped top. At the bottom of the coffee-cylinder 16 there is a screen or strainer 18, on which the ground or powdered coffee or tea or other commodity is to be supported. A cylindrical wire-gauze or finely-perforated section 19 is attached to the bottom of the cylinder 16, and below this finely-foraminous section 19 there is a cylinder 20, terminating in juxtaposition to the bottom of the vessel 1, the bottom edge of said cylinder 20 being provided with notches 21 for free passage of liquid.

In making coffee or for any similar operation the hinged lid 5 is thrown back and the ground or powdered coffee is passed down through the funnel-shaped top 12 into the cylinder 16, where it rests on the strainer 18. Water is then poured into the funnel 12 onto the coffee in the cylinder 16. The lid 5 is then closed down, and the pot or vessel 1 may then be placed on a stove. Either hot or cold water may be poured onto the coffee in the percolator. The water will percolate gradually through the ground or powdered coffee, extracting its essence and flavor, and will pass through the openings 21 and foraminous section 19 into the reservoir provided by the pot or outer vessel. When boiling takes place there will be a circulation from the openings 21 and lower foraminous section 19 into and upward in the pot or vessel 1, thence into the cylinder 16, through its upper foraminous section 17, and downward through the coffee in said cylinder 16. When the level of liquid in the pot 1 is below the upper foraminous section 17 of the percolator, the ascending steam will enter the said foraminous section 17 and by condensing in the percolator will pass down through the coffee in a continuous circulation, thus fully extracting the virtues of the berry. Tea can be made in the same manner, and, if desired, the vessel 1 and its inclosed percolator can be used also for extracting the virtues of various herbs and drugs.

The percolator is readily removable from the pot or vessel 1 for cleaning or any other purpose, and the spent coffee-grounds can be easily removed from the cylinder 16 by inverting the percolator and then pouring water through it from the cylinder end 20, so as to force out all sediment that may have collected on the strainer 18 or against the partly-foraminous walls of the percolator-cylinder.

It will be obvious that by providing for a slow and gradual percolation through a body of ground or powdered coffee confined in a slender partly-foraminous cylinder that is suspended in a closed vessel the valuable properties of the berry will be thoroughly extracted and the aroma preserved. The form and construction of the percolator described afford the most convenient facilities for charging or introducing the ground material and for promoting a circulation, and the entire utensil is economical, cleanly, and thoroughly efficient.

What I claim as my invention is—

1. The combination with the vessel having a movable lid, of the swinging percolator removable independent of said lid and consisting of the funnel-shaped top section pivotally suspended at its upper end, an imperforate cylinder having a transverse strainer in its lower end portion, a foraminous cylinder-section connecting the upper end of the imperforate cylinder to the pivoted funnel-shaped top section, and a foraminous cylinder-section depending from the lower end of the imperforate cylinder, substantially as shown and described.

2. The combination with the vessel having a movable lid, of the swinging percolator removable independent of said lid and consisting of the pivotally-suspended funnel-shaped top section, an imperforate cylinder having a transverse strainer in its lower end portion, a foraminous cylinder-section connecting the upper end of the imperforate cylinder to the swinging funnel-shaped top section, and a foraminous cylinder-section depending from the lower end of the imperforate cylinder and having a pendent cylinder-section terminating near the bottom of the vessel and constructed with lateral passages, substantially as shown and described.

In testimony whereof I have hereunto set my hand in presence of two subscribing witnesses.

AUGUST BURCKARD.

Witnesses:
PH. H. HOFFMAN,
CLARENCE STEWART.